Feb. 6, 1968    J. H. BIGELOW ET AL    3,368,172
HERMETICALLY SEALED POWER CONTACTOR COMPLETELY ADJUSTED
BEFORE ENCLOSED IN A PLURAL PART HOUSING
Filed March 30, 1965    5 Sheets-Sheet 1

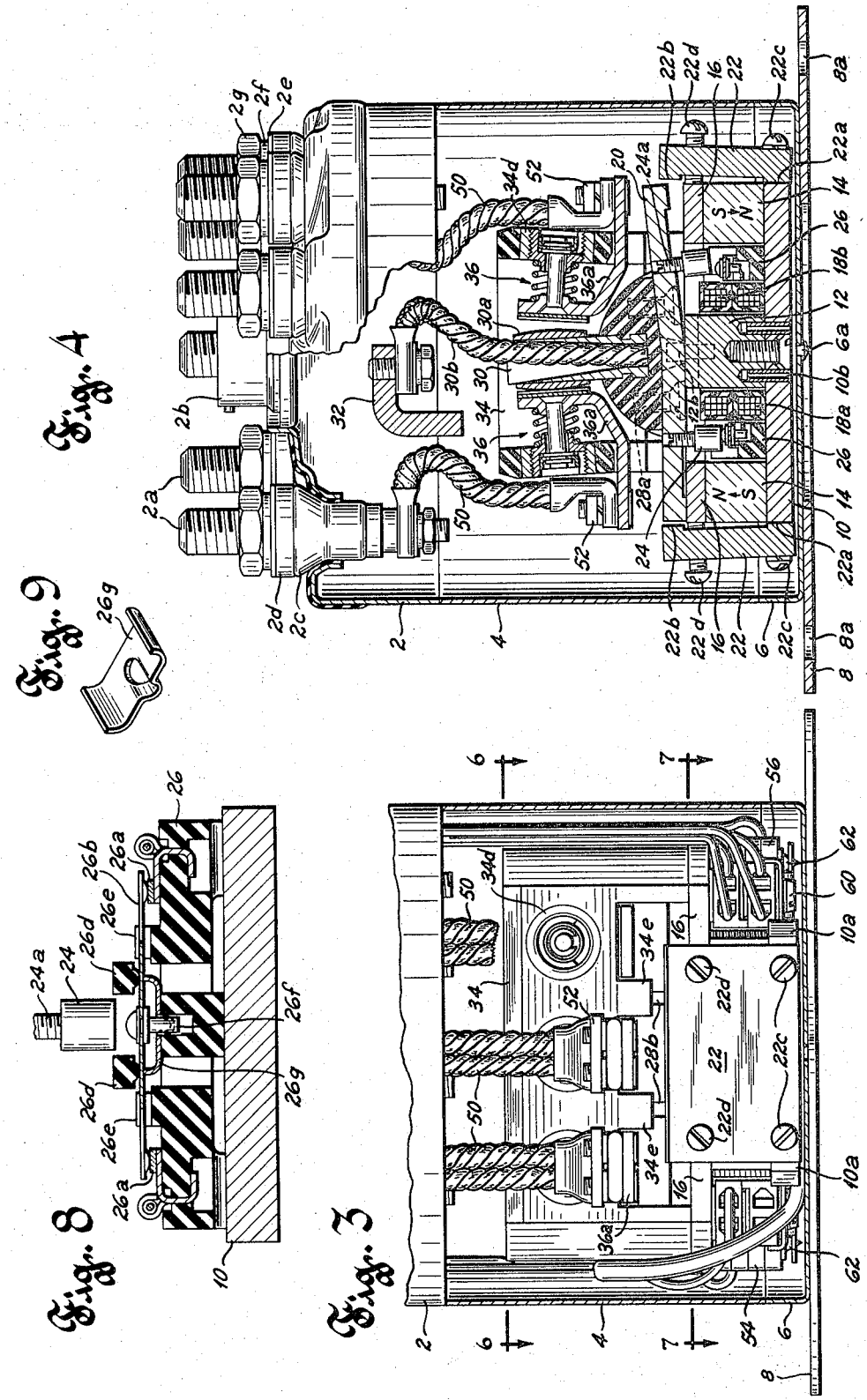

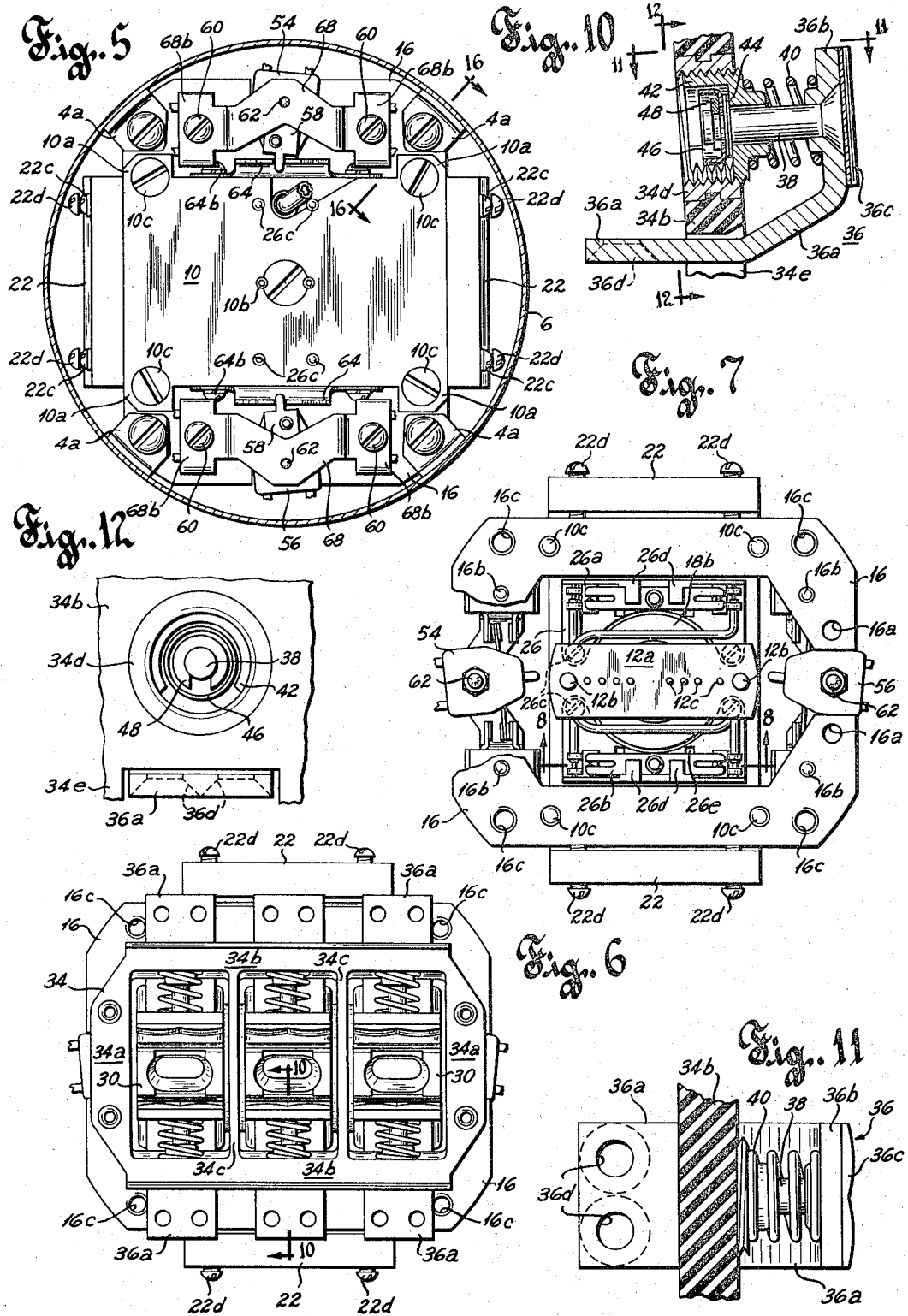

Fig. 13

United States Patent Office 3,368,172
Patented Feb. 6, 1968

3,368,172
HERMETICALLY SEALED POWER CONTACTOR COMPLETELY ADJUSTED BEFORE ENCLOSED IN A PLURAL PART HOUSING
James H. Bigelow and Joseph M. Hart, Milwaukee, Roy Hyink and John A. Quaal, Wauwatosa, Albert C. Snowdon, Milwaukee, and Merle R. Swinehart, Brookfield, Wis., assignors to Cutler-Hammer, Inc., Milwaukee, Wis., a corporation of Delaware
Filed Mar. 30, 1965, Ser. No. 443,966
10 Claims. (Cl. 335—124)

ABSTRACT OF THE DISCLOSURE

Hermetically sealed power contactor provided with a three part housing enabling complete assembly and adjustment of the electromagnetic contactor mechanism before it is sealed in the housing. The terminals are mounted in the top part, the contactor is mounted to the intermediate part and the lower part closes the open bottom. The electromagnetic contactor mechanism is provided with upstanding movable contacts on a rocking armature for engaging double-throw stationary contacts mounted on a surrounding insulating base. Auxiliary switches are mounted on opposite sides of the armature and control contacts are mounted below the armature.

This invention relates to hermetically sealed power contactors and more particularly to electromagnetically operable relays for switching a large amount of electrical power.

While not limited thereto, the invention is especially applicable to generator line contactors adapted for switching large values of three-phase alternating current.

An object of the invention is to provide an improved hermetically sealed power contactor.

A more specific object of the invention is to provide an improved electromagnetic contactor mechanism which can be assembled as a unit before it is enclosed in its housing thereby to afford visual adjustment of its parts.

Another specific object of the invention is to provide an improved power contactor which is smaller in size and weight than other known contactors of equivalent power switching capacity.

Another specific object of the invention is to provide an improved power contactor which has a smaller number of parts than other known contactors of equivalent power switching capacity.

Other objects and advantages of the invention will hereinafter appear.

These and other objects and advantages of the invention and the manner of obtaining them will best be understood by reference to the following detailed description of an embodiment of a hermetically sealed power contactor taken in conjunction with the accompanying drawings, wherein:

FIG. 3 is a right side elevational view of the contactor minus the terminal portion and having a portion of the shell broken away to expose the operating mechanism therein;

FIG. 4 is a partial cross-sectional view taken along line 4—4 of FIG. 1;

FIG. 5 is a bottom view of the contactor having the mounting plate and bottom portion of the housing removed to expose the operating mechanism therein along line 5—5 of FIG. 2;

FIG. 6 is a cross-sectional view taken along line 6—6 of FIG. 3 with the electrical conductors removed;

FIG. 7 is a cross-sectional view taken along line 7—7 of FIG. 3;

FIG. 8 is a partial cross-sectional view taken along line 8—8 of FIG. 7;

FIG. 9 is an isometric view of the pivot clip of FIG. 8;

FIG. 10 is an enlarged view of one of the stationary power contacts taken along line 10—10 FIG. 6;

FIG. 11 is a cross-sectional view taken along line 11—11 of FIG. 10;

FIG. 12 is a cross-sectional view taken along line 12—12 of FIG. 10;

FIG. 13 is an exploded isometric view of one of the auxiliary contact assemblies of the power contactor along with its actuating lever and a fragmentary portion of the contactor armature;

Figure 1:
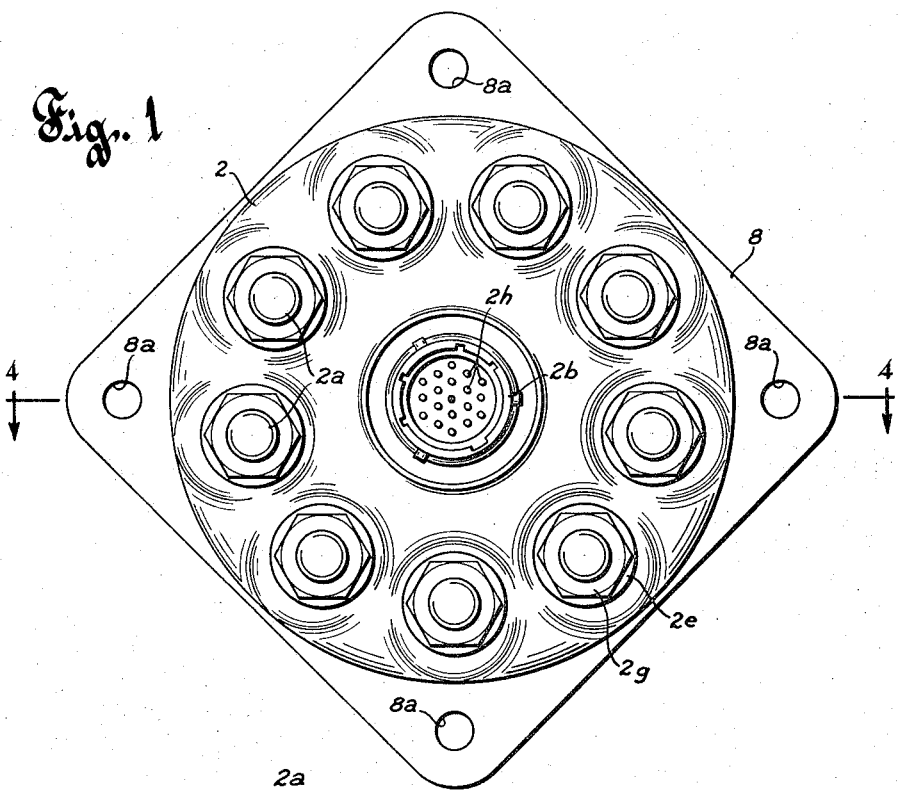
FIGURE 1 is a top plan view of a power contactor constructed in accordance with the invention and showing the electrical terminal end thereof and mounting plate.
Figure 2:
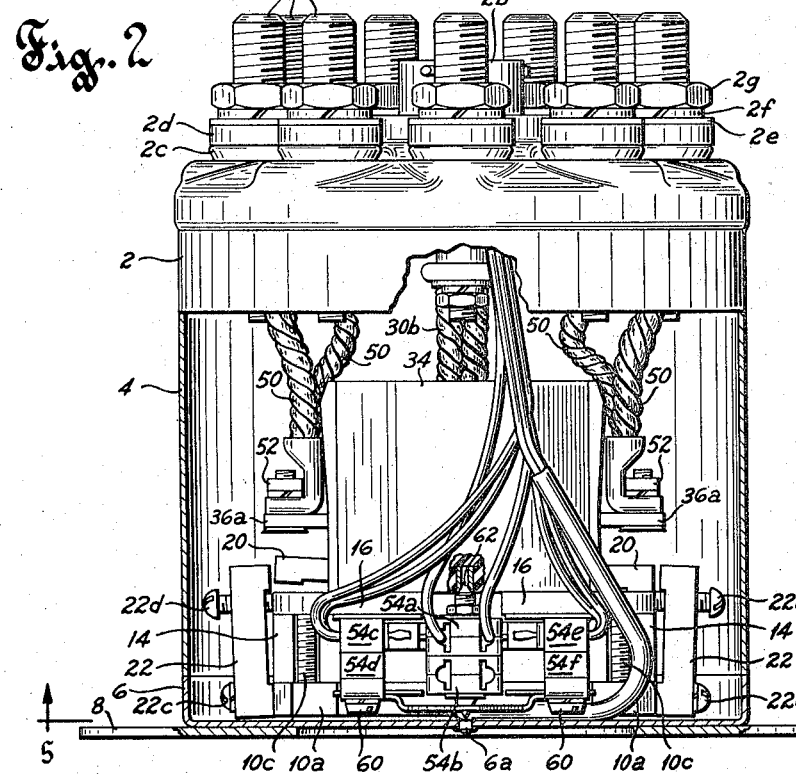
FIG. 2 is a front elevational view of the contactor of FIG. 1 having a portion of the shell or housing broken away to show the operating mechanism therein.

Referring to FIGS. 1 and 2, there is shown a hermetically sealed contactor constructed in accordance with the invention. The hermetically sealed housing comprises a top cover 2, a shell 4, and a bottom cover 6 and mounting plate 8 forming a bottom cover assembly.

Top cover 2 is a generally cup-shaped member having a substantially flat bottom and short cylindrical sides. The bottom is provided with a plurality such as nine holes arranged in a circle for accommodating nine terminals 2a and a center hole for accommodating a bayonette type connector plug 2b. Each of the nine terminal holes is provided with a metal sleeve 2c having a frusto-conical upper end which fits into and is rigidly secured to a complimentary frusto-conical shape in the cover around each hole as disclosed in J. E. Davies et al. Patent 2,951,133, dated Aug. 30, 1960. This sleeve may be fused to the cover by a glass coating or the like. A terminal 2a extends through each sleeve 2c and may be soldered to the sleeve at the lower end thereof. A stepped bushing 2d fits into the conical end of the sleeve and may be partially sealed thereto by a resilient O-ring or the like to prevent accumulation of moisture. In addition, each terminal is provided with a flat washer 2e, a lock washer 2f and a hex nut 2g to afford connection of a wiring lug thereto. The central connector plug 2b comprises a flanged sleeve having an insulating disc secured therein through which extend a plurality of connector pins 2h. This connector plug may be secured in the central hole of the top cover in a suitable manner as by soldering the flange thereof within the cylindrical periphery of the hole, such cylindrical periphery having been formed by bending the edge of the hole outwardly. This cup-shaped member is inverted over the power contactor to form the top cover through which the terminals extend for connection to an external circuit. These terminals and pins of the connector plug are connected to the power contactor as hereinafter more fully described.

Figure 16:
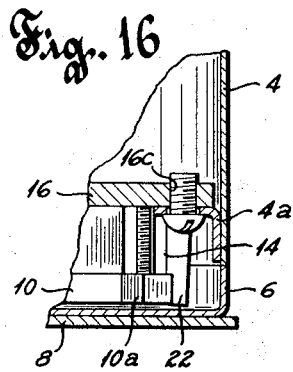
FIG. 16 is a cross-sectional view taken along line 16—16 of FIG. 5.

Shell 4 of the housing comprises a cylindrical member equal in diameter to the cylindrical portion of the top cover. This cylindrical member surrounds the power contactor and is provided at is lower internal portion with four brackets 4a shown in FIGS. 5 and 16 which abut the corners of the pole pieces and are rigidly secured thereto by screws or the like. In this assembled position, the upper edge of the shell abuts the lower edge of the cylindrical portion of the top cover and they are welded together at their abutting edges.

Mounting plate 8 is a flat plate of square shape and is provided with a large hole at is center and four mounting holes 8a at its four corners. Around the large center hole the mounting plate is rigidly secured as by brazing to the bottom of shallow cup-shaped bottom cover 6. The short cylindrical portion of the bottom cover is provided with a diameter equal to the diameter of the shell and the lower edge of the latter is welded to the upper edge of the bottom cover to enclose the power contactor. A small hole is provided in the center of the bottom cover for insertion of inert gas after which this hole may be closed by a plug 6a welded in place.

As shown in FIGS. 2 to 5, the power contactor is provided with an electromagnet for actuating the movable contacts and permanent magnets for latching them in one or the other actuated position. The permanent magnets also assist the electromagnet in operating the armature. This electromagnet comprises a substantially rectangular bottom plate 10 of magnetic material having pairs of forward and rearward projections 10a on the front and rear corners, respectively, as shown in FIG. 5 with holes therethrough. Plate 10 also has a hole through the center thereof through which a screw extends from below for rigidly securing to the upper surface thereof an upstanding, cylindrical magnetic core 12 most clearly shown in FIGS. 4 and 7. The cylindrical core has integrally secured to its upper end a rectangular strip 12a of magnetic material shown in FIG. 7 which overlies across the center of bottom plate 10 for supporting the armature hereinafter described. One or more pins 10b may extend through bottom plate 10 into core 12 to prevent the core from turning as shown in FIGS. 4 and 5.

The power contactor is provided with a pair of permanent magnets 14 assisting in operating and for latching the armature in either one of its actuated positions. One of these permanent magnets rests across each end, the left and right ends as shown in FIGS. 2 and 4, of bottom plate 10. These bar magnets are provided with vertical grooves in their ends to provide clearance for screws 10c which extend through the forward and rearward projections 10a of bottom plate 10 into threaded engagement with pole pieces 16 hereinafter described.

As shown in FIG. 7, two flat pole pieces 16 of U-shape are arranged so that their yoke portions rest on the permanent magnets and their legs extend beyond the magnets and toward the respective legs of the other pole piece to provide supporting means for the insulating stationary contact base, the auxiliary contacts and the housing shell. For this purpose, the legs of the pole pieces are provided with holes 16a for receiving screws to secure the insulating stationary contact base thereto, holes 16b for receiving screws to secure the stationary, auxiliary contact blocks thereto and holes 16c for receiving screws to secure the housing shell brackets thereto. Still further threaded holes are provided in the pole pieces as shown in FIGS. 2 and 7 for receiving screws 10c to clamp the pole pieces and permanent magnets to the bottom plate.

Two operating coils 18a and 18b are wound around the cylindrical core for energizing the pole pieces to attract an armature 20 to one or the other pole piece depending upon which coil is switched to an electrical power supply source, the electromagnet being polarized by the permanent magnets as shown in FIG. 4. These coils are connected through so-called "cut-throat" contacts and pins of connector plug 2b to an external circuit. These "cut-throat" contacts serve to disconnect the energized coil from the power supply source immediately following operation of the contactor, the latter being held in its operated position by the permanent magnet latch as hereinafter more fully described. Alternatively, a single coil with current reversing means could be used in place of the two coils.

Figure 15:
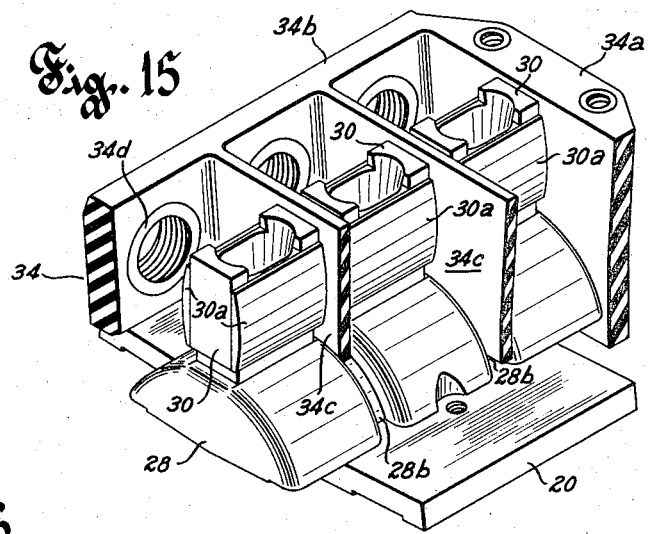
FIG. 15 is an isometric view of the assembly including the armature and three movable contacts.

As shown in FIGS. 2, 4 and 15, armature 20 is a flat rectangular magnetic member having its ends bent upwardly at its center across its shorter dimension to the total small angle of about 6 to 7 degrees. This allows the armature to rest at its center on strip 12a of the core and to rock or pivot thereon. To hold the armature from shifting laterally, strip 12a is provided with two upstanding posts 12b shown in FIGS. 4 and 7 near its ends received in frusto-conical holes in the armature, shown in FIGS. 4 and 13, to permit the armature to rock into engagement with the pole pieces. To eliminate any play between the armature and posts 12b at the frusto-conical holes, strip 12a is provided with a row of spring steel pins 12c upstanding between posts 12b, these pins being snugly received in complimentary holes in the armature at its pivot. These pins may have a small amount of play in their holes when the armature is at its midposition but will bend slightly when the armature is rocked in either direction to eliminate all play therebetween. The lower surface of the armature is undercut near its ends as shown in FIG. 4 to reduce the area engaging the pole piece and increase the sealing force.

A pair of magnetic shunts 22 are provided to adjust the latching force of the permanent magnets on the armature. Each magnetic shunt is a rectangular plate provided with an undercut on one surface at the center and throughout its longer dimension to leave a lower ridge 22a and an upper ridge 22b immediately adjacent at its respective lower and upper edges as shown in FIG. 4. The lower ridges of the two magnetic shunts abut the left and right end edges of bottom plate 10 and are secured thereto by pairs of screws 22c, the screw holes in the magnetic shunts being slightly enlarged to allow limited pivoting of the magnetic shunts thereon. Each magnetic shunt is also provided with a pair of adjusting screws 22d shown in FIGS. 3 and 4 threaded through the upper portions thereof immediately below upper ridge 22b so that the screw ends abut the pole pieces. While securing screws 22c may be made of magnetic material, adjusting screws 22d are made of non-magnetic material and afford adjustment of the length of the air gap shown in FIGS. 4 and 7, between upper ridge 22b and the end of the armature thereby to adjust the magnetic force whereby the permanent magnet maintains the armature closed.

The armature is provided with a pair of pushrods 24 depending therefrom for actuating bridging type cut-throat contacts mounted in the spaces between the coils and the permanent magnets. For mounting the pushrods, the armature is provided with a pair of threaded holes about halfway between its center pivot and the ends thereof overlying the spaces between the coils and the latching magnets as shown in FIGS. 4 and 15. Each pushrod comprises a threaded shank 24a having a screwdriver slot in its upper end so that it can be adjusted down from the armature. The lower end of such shank has a molded cylinder also shown in FIG. 8 for engaging the cut-throat contact to open the same.

As shown in FIGS. 7 and 8, each cut-throat contact is of the bridging or double-break type and is provided with an insulating base 26 for supporting a pair of stationary contacts 26a and abridging contact 26b. Base 26 is molded in generally rectangular form with the edge next to the coil having an arcuate depression in top view to provide a substantially U-shaped member. This base is positioned so that the arcuate depression partially surrounds the coil and the opposite straight edge abuts the permanent magnet. The ends of the legs of this U-shaped member are provided with holes for screws 26c which secure the base to the upper surface of bottom plate 10 as shown in FIGS. 5 and 7, these screws being shown in dotted lines beneath strip 12a of the core. The forward and rearward ends of the base are each provided with a transverse slot opening from the top surface into a cavity in the bottom surface for receiving the downwardly inserted shank of the stationary contact, the extreme end of which is bent under in such cavity as shown in FIG. 8 to rigidly secure the stationary contact to the base. The stationary contact lies on the upper surface of the base for engagement by one bifurcated end of the movable bridging contact. Each stationary contact shank, which is a sheet metal stamping, is also provided above the base with a pair of spaced apart hooks for making an electrical and mechanical connection to the conductor. For this purpose, one of these hooks may be crimped around the stripped end of a wire and the adjacent hook may be crimped around the insulated portion of the wire adjacent the stripped end thereof as shown in FIG. 7.

The edge of base 26 abutting the permanent magnet is provided with a pair of upstanding ridges extending from the rearward and forward ends of the base into spaced apart relation at the center and terminating in lateral projections 26d extending over the movable contact as shown in FIGS. 7 and 8. A pair of lower upstanding posts 26e are molded in the upper surface of the base adjacent the arcuate edge as shown in FIGS. 7 and 8. The bridging contact is slid over these posts beneath projections 26d and it snaps behind these posts 26e whereby it is held in place. A depending pin 26f is riveted to the center of the movable contact and is received in a slot in the base to keep the movable bridging contact from sliding lengthwise.

The movable bridging contact is normally bowed upwardly at its center so that when it is snapped in place in the base beneath projections 26d, the bifurcated ends will be biased downwardly into engagement with the stationary contacts with suitable contact pressure. Depending pin 26f also extends through a hole in a pivot clip 26g which rests on the center portion of the base. This clip has upturned ends as shown in FIG. 8 beneath the movable contact and in alinement with overlying projections 26d. As will be apparent, when the armature moves pushrod 24 downwardly, it will engage the head of pin 26f and press the movable contact against the upturned ends of the clip and bow the central part of the movable contact downwardly. This causes the ends to be raised and separated from the stationary contacts to open the coil circuit.

Figure 13:
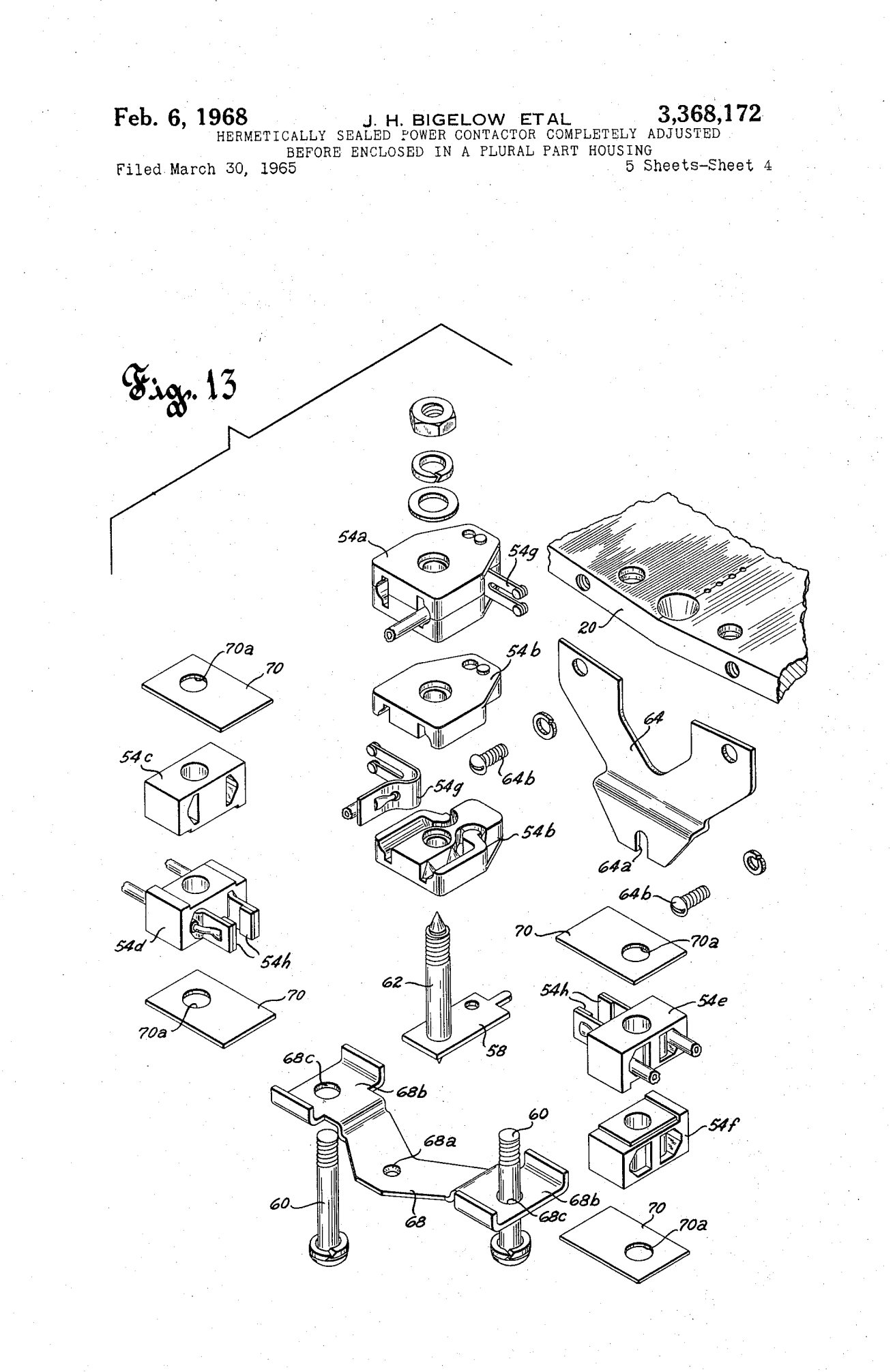

The three movable contacts for the three-pole double-throw power contactor are mounted in a row along the upper surface of the armature as shown in FIGS. 4 and 15. For this purpose, a molding 28 having substantially the shape of a partial solid cylinder is rigidly secured by four screws 28a across the upper surface of the armature. The flat side of this molding is not exactly flat but is provided with two planes complementary to the upper surface planes of the armature so that the two match. The securing screws extend through holes in the armature, two of which are shown in FIG. 13, and their heads are counter sunk thereinto and threadedly engage tapped inserts embedded in this molding.

Figure 14:
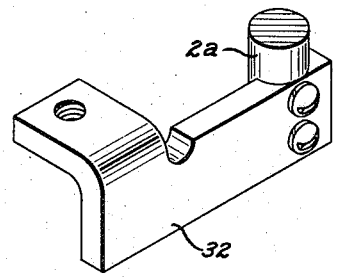
FIG. 14 is an isometric view of the connector and terminal associated with the center movable contact of the power contactor.

The upper arcuate portion of this partial cylinder has cemented in downwardly extending holes therein three movable contacts 30 spaced apart in a row therealong and extending upwardly therefrom. As shown in FIGS. 4, 6 and 15, each movable contact has a flat tubular form with a generally rectangular outer shape and an upwardly flared, flattened hole therethrough. The lower portion of the movable contact which extends into the hole in molding 28 may be provided with horizontal grooves on its sides as shown in FIG. 4 to afford rigid cementing thereof in the molding. A pair of contact elements 30a are secured to opposite flat sides of the upper portion of the movable contact for engaging stationary contacts hereinafter described. As shown in FIGS. 4 and 15, the contacting faces of contact elements 30a are machined to provide them with a small continuous curvature in a vertical plane for reasons hereinafter described. A copper cable connector 30b extends down through the flared hole in the movable contact and its lower end is electrically connected as by brazing to the lower end portion of the movable contact. This cable connector extends out through the hole in the movable contact and is provided with a suitable lug at its other end for connecting it to one of the terminals mounted in the top cover of the housing. The cables of the two outer movable contacts have their lugs connected directly to the terminals while the cable of the central movable contact has its lug connected through a bar connector 32 shown in FIG. 14 to the proper terminal 2a. Two grooves 28b shown in FIGS. 3 and 15 in the upper rounded surface of molding 28 between the central movable contact and the movable contacts on opposite sides thereof are provided for receiving dividing walls of an insulating contact base hereinafter described.

As shown in FIG. 6, the power contactor is provided with two sets of stationary power contacts, each set having three contacts for cooperation with the three movable contacts. These sets of stationary contacts are supported on the opposite side walls of an insulating contact base 34 shown in FIGS. 2, 3 and 15 and the two sets of stationary contacts are positioned on opposite sides of the movable contacts within the base as shown in FIGS. 4 and 6.

As shown in FIG. 6, contact base 34 is provided with similar front and rear walls 34a and similar left and right side walls 34b. The space within these four walls is divided into three equal compartments by two thinner dividing walls 34c. Each compartment encloses two stationary contacts and the associated movable contact of one pole of the three-pole double-throw contactor. These three compartments are open at the top as shown in FIGS. 4 and 6 and the cable connectors of the movable contacts extend through this open top to the terminals.

Contact base 34 is secured in place by four countersunk screws extending through holes 16a in the inwardly projecting ends of pole pieces 16 into threaded engagement in suitable tapped inserts embedded in the front and rear walls of contact base 34. The front and rear walls of the contact base are also provided with holes centrally of the lower edges thereof and have inserts embedded therein. These inserts are provided with smooth holes as shown in FIG. 2 having a frusto-conical end forming pivots for auxiliary contact supports hereinafter described.

As shown in FIGS. 3 and 4, contact base 34 is provided with means mounting stationary contacts 36 thereon. This means comprises three holes in a horizontal row along each side thereof having internally threaded ring inserts 34d embedded therein as more clearly shown in FIGS. 10 and 15. Directly beneath each such insert, the wall of the contact base is notched from its lower edge upwardly as shown in FIG. 3 leaving depending wall portions 34e between the notches. The connector portions of stationary contact supports 36a extend through these notches as shown in FIGS. 4 and 10. The upper edges of the front and rear walls 34a of the contact base may each be provided with tapped inserts embedded therein, as shown in FIG. 6, for receiving screws securing wire guides (not shown) thereto for guiding the wires which extend from the coil, cut-throat contacts and auxiliary contacts to connector plug 2b at the center top of the housing.

As shown in FIGS. 10 and 12, each stationary contact 36 is mounted on a contact support 36a having the end portion 36b which carries contact element 36c bent to an angle of substantially 90 degrees upwardly from the substantially horizontally disposed connector portion. The midportion of the contact support is bent at a suitable intermediate angle relative to the connector portion and the contact element portion to provide clearance for movable contact carrying molding 28.

Contact support 36a is resiliently mounted in tapped insert 34d so that it can move outwardly against the force of a compression spring when it is engaged by the movable contact. For this purpose, a mounting pin 38 extends through vertical portion 36b of the contact support with its head counter sunk in the latter beneath contact element 36c. After the pin is inserted in the hole, contact element 36c may be rigidly secured thereover by brazing or the like. Mounting pin 38 extends through a helical compression spring 40 and an end hole of an adjusting plug 42. As shown in FIG. 10, plug 42 is provided with an enlarged hole at its other end within the externally threaded portion for receiving means for securing mounting pin 38 to the plug. These securing means comprise one or more shim washers 44, a cup washer 46 and a slotted securing washer 48. To enable assembly of these parts, adjusting plug 42 has one side portion cut out as shown in FIG. 12. As will be apparent, pin 38 may be pushed in against the force of spring 40 far enough so that the groove at its end clears the edge of cup washer 46 whereupon slotted washer 48 may be slid through the open side of plug 42 into the groove in the pin. The cup washer prevents the slotted washer from sliding out of place.

As shown in FIGS. 6 and 11, contact elements 36c of the stationary contacts are each provided with a double crown when viewed from the top or in horizontal plane. This provides the advantages of bifurcated contacts. That is, it increases the reliability of making circuit because two rounded surfaces come into contact with the movable contact. This spring-biased construction also allows the stationary contacts to move straight back when engaged by the rocking movable contacts affording a substantially mechanical advantage for breaking a weld when the contacts are opened. The wear allowance may be adjusted by turning adjusting plug 42 in threaded insert 34d to move contact element 36c nearer to or farther from the movable contact as required. The cut-out portion of the adjusting plug affords insertion of a special tool thereinto to turn it.

The connector portion of contact support 36a is provided with a pair of countersunk holes 36d at its end outside contact base 34 for securing a connector cable thereto. For this purpose, a pair of screws extend upwardly through these holes and through corresponding holes in an end lug of a connector cable 50 into threaded engagement in a pair of tapped holes in a strap 52 as shown in FIG. 3, there being locking washers under the strap. The lugs at the other ends of connector cables 50 are connected to respective terminals 2a. As will be apparent in FIG. 1, the contactor is provided with nine power terminals 2a to which the six stationary contacts and the three movable contacts are connected.

The power contactor is also provided with auxiliary control contacts for operating signaling or indicating devices and for interlock switching purposes or the like in each operating position thereof. For this purpose, one set 54 of auxiliary contacts is mounted at the front of the electromagnet assembly as shown in FIG. 2 and another set 56 of auxiliary contacts is similarly mounted at the rear as shown in FIG. 3.

As shown in FIG. 13, each set of auxiliary switch contacts has capacity for four single-pole double-throw switches although the full capacity might not be used. Only auxiliary switch 54 will be described in detail since auxiliary switch 56 is similar thereto. As shown in the exploded view in FIG. 13, the auxiliary switch is provided with two movable-contact blocks 54a and 54b and four stationary contact blocks 54c, 54d, 54e and 54f. The two movable-contact blocks are stacked one on top of the other and a pair of stacked stationary-contact blocks is arranged on each side of the movable-contact block as shown in FIG. 2.

Each movable-contact block 54a and 54b in FIG. 13 is comprised of two symmetrical halves of insulating material having provision for clamping two movable contacts 54g in grooves therebetween so that the bifurcated contacts extend laterally in opposite directions between pairs of stationary contacts 54h. Each movable contact comprises a bent strap of electrically conducting material having a bifurcated end provided with contacting elements and a hole on its shank to which a connector wire is welded. When this movable contact is clamped between the halves of its housing or contact block, the bifurcated contacts extend from the side of the contact block and the insulated connector wire extends from the end of the contact block, the soldered connection being enclosed in the groove in the contact block. The movable-contact blocks are provided with a vertical hole through substantially the midportion thereof for clamping them in stacked relation to a pivoting and actuating shaft as hereinafter described. Each half of each movable contact block is also provided with suitable registering means such as a projection and depression for maintaining the stacked contact blocks in proper alinement with one another and with a contact lever 58 when such projection enters a hole in the latter.

Each stationary contact block 54c to 54f is provided with a pair of substantially triangular holes horizontally therethrough for accommodating stationary contacts 54h and connector wires welded thereto. The connector wire is pushed through the triangular hole in the stationary contact block first and the stationary contact is pushed in after it up to the jog in the stationary contact. The extreme end of the shank of the stationary contact is then bent over into an undercut depression at the rear of the block to secure the stationary contact in place. Each stationary contact block is also provided on one side with a suitably stepped configuration complimentary to that on the abutting block and matching it to retain the blocks in alinement with one another when they are stacked. A vertical hole extends through blocks 54c to 54f to receive clamping screws 60 whereby the blocks are secured to pole pieces 16.

As shown in FIG. 13, a shaft 62 has a contact lever 58 rigidly secured near the lower end thereof so that it extends at a ninety degree angle from the shaft. This shaft extends through the holes in the movable contact blocks and the upper end of the shaft is provided with a flat washer, a lock washer and a nut to clamp the movable contact blocks on the shaft. Contact lever 58 is provided with a small hole to receive a corresponding projection on the lower surface of block 54b to prevent the movable contact blocks from turning on the shaft. The projecting end of contact lever 58 is provided with a reduced portion extending into a slot 64a in an armature lever 64 which is secured by a pair of screws 64b and suspended from one edge of armature 20. When the armature rocks, it swings lever 64 to rotate contact lever 58 and shaft 62 and the movable contact blocks clamped thereon thereby to actuate the movable contacts into and out of engagement with stationary contacts 54h.

Shaft 62 is journaled for rotation in the aforementioned manner. For this purpose, the upper end of the shaft above the nut is provided with a conical portion which is rotatably supported in the insert embedded in the lower edge of the front wall 34a of contact base 34 as shown in FIG. 2. The shaft of the other auxiliary switch is similarly supported in an insert in the rear wall of the contact base.

The lower end of shaft 62 extends slightly below contact lever 58 and is provided with a substantially conical shape for rotatably pivoting in a complimentary frustoconical hole 68a at the middle of a supporting bracket 68. As shown in FIG. 13, bracket 68 is provided with a flat V-shaped center portion also shown in FIG. 5. This bracket 68 is a sheet metal stamping and has T-shaped portions 68b on opposite sides of the center portion formed integrally with the latter. The ends of the crosses on the T-shaped portions are bent upwardly and a central hole 68c is provided therein. The turned ends of portions 68b grip the forward and rearward sides of stationary contact blocks 54d and 54f and screws 60 extend through holes 68c and the holes in the stationary contact blocks to clamp the latter against the lower surfaces of pole pieces 20. As will be apparent, the upturned ends on portions 68b of the bracket hold the stationary contact blocks and stationary contacts securely in their proper position relative to the movable contacts. Insulating sheets 70 are placed above and below the stationary contact blocks with screws 60 extending through holes 70a therein to insulate the contacts from the pole pieces and from bracket 68.

Figure 17:
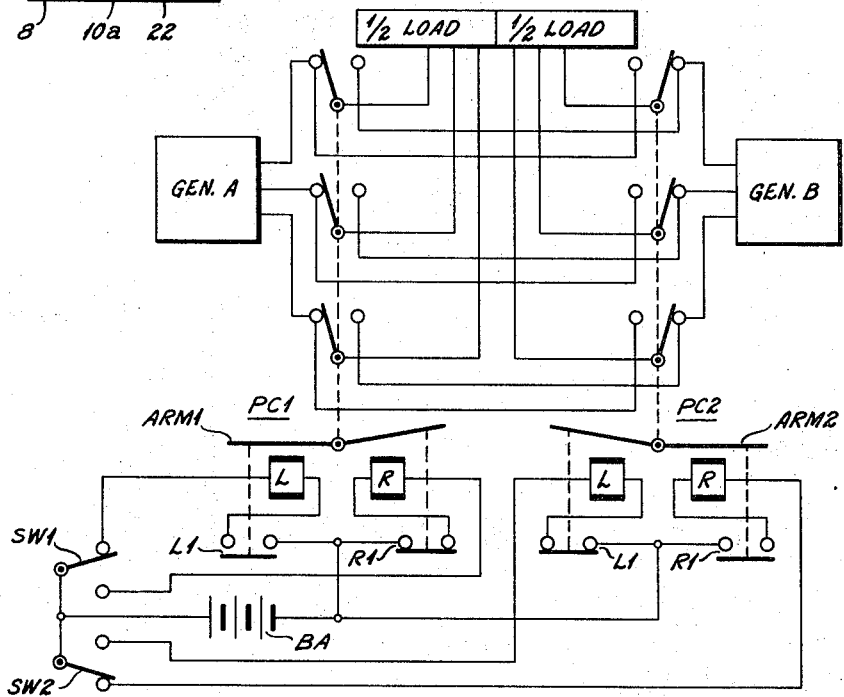
FIG. 17 is a circuit diagram showing how two of the power contactors, schematically shown therein, can be used.

FIG. 17 shows how the power contactor shown in FIGS. 1–16 can be used. As shown therein, two power contactors normally connect two generators to the respective halves of a load. If one generator should fail, the associated power contactor may be operated to connect its half of the load to the other generator. In this manner, the operating generator will supply the full load while the defective generator is being repaired.

More specifically, the three-phase output of generator A is connected to the left-hand set of three stationary contacts of power contactor PC1 and the set of three movable contacts normally in engagement therewith as shown in FIG. 17 are connected to supply power to one-half of the load. In a similar manner, the three-phase output of generator B is connected to the right-hand set of three stationary contacts of power contactor PC2 and the set of three movable contacts normally in engagement therewith are connected to supply the other half of the load.

The right-hand set of three stationary contacts of contactor PC1 are connected to generator B and the left-hand set of three stationary contacts of contactor PC2 are connected to generator A.

If generator A should fail, its half of the load should be switched to generator B. To this end, switch SW1 is turned to its lower contact to energize coil R of contactor PC1 across battery BA. Coil R of contactor PC1 attracts its armature ARM1 to shift the movable contacts from the left-hand set to the right-hand set of stationary contacts thereby to connect the entire load to generator B. When armature ARM1 completes its movement, it opens cut-throat contact R1 to interrupt energization of coil R. The permanent magnet latch described in connection with FIG. 4 now maintains the movable contacts in engagement with the right-hand set of stationary contacts of contactor PC1. As the armature was rocked under the influence of coil R, the other end of the armature released cut-throat contact L1 to allow it to close to prepare the circuit of coil L so that it can be energized to restore the contacts to their original position by actuation of switch SW1 to its upper contact.

In a similar manner, power contactor PC2 is provided with coils L and R, cut-throat contacts L1 and R1, triple-pole double-throw power contacts and an armature ARM2. And a manual switch SW2 is provided for alternately energizing coils L and R to switch the triple-pole movable contacts from one set of stationary contacts to the other.

While the apparatus hereinbefore described is effectively adapted to fulfill the objects stated, it is to be understood that we do not intend to confine our invention to the particular preferred embodiment of hermetically sealed power contactor disclosed, inasmuch as it is susceptible of various modifications without departing from the scope of the appended claims.

We claim:

1. In a hermetically sealed contactor having a plural-part housing including a plurality of electrical terminals extending through a wall of one part thereof and sealed thereto, an electromagnetic contactor mechanism arranged for assembly and adjustment as a unit before it is connected to the terminals and before it is enclosed in the housing comprising:

an electromagnet comprising a pair of spaced pole pieces and armature supporting means therebetween;
a rockable armature;
means pivoting said armature on said supporting means for rocking in opposite directions in response to selective magnetic attraction of its ends to said pole pieces;
movable contact means mounted on the upper surface of said armature for rocking movement therewith;
an insulating stationary contact support mounted on said electromagnet over said armature to surround said movable contact means and having an opening at the top thereof;
stationary contact means mounted in said support for electrical engagement by said movable contact means when said armature is rocked;
electrical connector means connecting said movable contact means and said stationary contact means to the terminals, the connector means for said movable contact means extending through said opening;
and means securing said electromagnet to brackets on the inner walls of another housing part encircling said mechanism before the housing parts are sealed to one another.

2. The invention defined in claim 1, wherein said movable contact means comprises:
an insulating movable contact base mounted on said armature;
and a plurality of upstanding movable contacts mounted on said base;
and said electrical connector means comprises flexible connectors connecting said movable contacts to said terminals.

3. The invention defined in claim 2, wherein:
said movable contacts are each provided with a hole therethrough;
and said flexible connectors extend from the associated terminals through the holes in the movable contacts and are connected to the movable contacts within said holes at the lower ends thereof.

4. The invention defined in claim 1, wherein said armature pivoting means comprises:
a row of resilient pins on said armature supporting means;
and a row of holes in said armature for freely receiving said pins to pivotally support said armature on its support and being of a size to cause limited bending of said pins when the armature is rocked to eliminate all play therebetween.

5. The invention defined in claim 1, wherein:
said armature supporting means comprises a magnetic core;
operating coil means surrounding said core;
control contact means in the space between said coil and each of said pole pieces for controlling the circuit of said operating coil means;
and actuator means depending from said armature for operating said control contact means when said armature is rocked.

6. The invention defined in claim 1, wherein said stationary contact means comprises:
a plurality of stationary contact members extending from within said insulating support to the exterior thereof;
stationary contact elements on said members within said insulating support;
and means mounting said stationary contact members to the inner walls of said insulating support and resiliently biasing them a limited extent toward said movable contacts;
and said connector means comprises flexible conductors connecting the exterior portions of said members to said terminals.

7. The invention defined in claim 1, together with:
a pair of auxiliary switches, one on the front and one one on the rear of said electromagnet;
each said auxiliary switch comprising stationary contacts and movable contacts;
extensions on said pole pieces under which the stationary contacts of said auxiliary switches are mounted;

means comprising a bracket and inserts in said insulating support for pivotally supporting the movable contacts of said auxiliary switches adjacent their associated stationary contacts;

and levers secured to said armature for actuating the movable contacts of the auxiliary switches when said armature is rocked.

8. A hermetically sealed electromagnetic contactor comprising, in combination:

an electromagnetic contactor mechanism constructed and arranged for assembly and adjustment as a unit before it is enclosed in its housing;

and a three-part housing arranged for enclosing and hermetically sealing said contactor mechanism from the atmosphere;

said housing comprising a top cover part having a plurality of electrical terminals extending therethrough:

an intermediate housing part surrounding and supporting said contactor mechanism and connected to said top cover part;

said intermediate part including a plurality of internal brackets and means securing said contactor mechanism to said brackets and means for electrically connecting said mechanism to the terminals within said top cover part;

and a bottom part connected to said intermediate part to complete the enclosing housing for said contactor mechanism;

and the abutting portions of said top cover part and said intermediate part and the abutting portions of said intermediate part and said bottom part matching each other to afford welding of the housing parts together.

9. The invention defined in claim 8, wherein said electromagnetic contactor mechanism comprises:

an electromagnet comprising a pair of spaced pole pieces, each including permanent magnet polarizing means, and a magnetic core surrounded by coil means forming an armature support between said pole pieces;

an armature and means pivoting said armature on the end of said core for rocking movement;

movable contact means mounted on said armature and electrically connected to some of said terminals;

stationary contact means electrically connected to others of said terminals;

and insulating means mounted on said pole pieces for supporting said stationary contact means to afford engagement by said movable contact means when said armature is rocked.

10. The invention defined in claim 18, wherein said bottom part comprises:

a small hole and a plug adapted to be welded in said hole after inert gas has been introduced in said housing.

References Cited
UNITED STATES PATENTS

| | | | |
|---|---|---|---|
| 2,483,658 | 10/1949 | Miller | 335—234 |
| 2,881,365 | 4/1959 | Bernstein | 335—276 X |
| 3,239,627 | 3/1966 | Davies et al. | 335—132 X |

BERNARD A. GILHEANY, *Primary Examiner.*

R. N. ENVALL, JR., *Assistant Examiner.*